(12) United States Patent
Reed (10) Patent No.: US 10,847,958 B1
(45) Date of Patent: Nov. 24, 2020

(54) CONNECTOR FOR ELECTRICAL CONDUIT AND METHOD OF USE

(71) Applicant: Charlotte Reed, Morgantown, IN (US)

(72) Inventor: Charlotte Reed, Morgantown, IN (US)

(*) Notice: Subject to any disclaimer, the term of this patent is extended or adjusted under 35 U.S.C. 154(b) by 0 days.

(21) Appl. No.: 16/871,019

(22) Filed: May 10, 2020

(51) Int. Cl.
F16L 43/00 (2006.01)
H02G 3/06 (2006.01)
H02G 3/22 (2006.01)

(52) U.S. Cl.
CPC ............ *H02G 3/0616* (2013.01); *H02G 3/22* (2013.01)

(58) Field of Classification Search
CPC ........ F16L 43/00; F16L 43/001; F16L 43/008; F16L 5/00
USPC .... 285/149.1, 179, 183; 174/480, 481, 68.1, 174/68.3, 81, 74 R
See application file for complete search history.

(56) References Cited

U.S. PATENT DOCUMENTS

| | | | |
|---|---|---|---|
| 1,887,192 A | 11/1932 | Betts, Jr. | |
| 1,888,546 A | 11/1932 | Anderson | |
| 2,111,553 A * | 3/1938 | Chew .................. | F16L 27/0861 239/587.3 |
| 2,654,619 A * | 10/1953 | Gaum .................. | F16L 43/001 285/148.23 |
| 2,874,980 A * | 2/1959 | Browning ............. | F16L 41/004 285/189 |
| 2,878,838 A * | 3/1959 | Budge .................. | F16L 37/008 285/189 |
| 2,879,848 A * | 3/1959 | Drummond ............. | E21B 17/00 166/68 |
| 2,967,722 A | 1/1961 | Lifka | |
| 3,185,506 A * | 5/1965 | Szlashta ................... | F23J 13/04 285/183 |
| 4,307,901 A * | 12/1981 | Orberg ...................... | F16L 3/00 285/3 |
| 5,872,335 A | 2/1999 | Mullen, Jr. | |
| 6,103,202 A * | 8/2000 | Hall ....................... | F01N 3/2853 422/171 |
| 6,593,531 B2 | 7/2003 | Hulsmann et al. | |
| 6,768,057 B2 | 7/2004 | Blake | |
| 9,334,885 B2 * | 5/2016 | Okihara ................ | F04D 29/688 |
| 2002/0125033 A1 | 9/2002 | Blake | |
| 2004/0084899 A1* | 5/2004 | Gonzales .................. | F15D 1/02 285/179 |

(Continued)

*Primary Examiner* — Aaron M Dunwoody
(74) *Attorney, Agent, or Firm* — Roberts IP Law; John Roberts (57) ABSTRACT

A connector for an electrical conduit is configured to make a 90-degree turn behind drywall and tight spaces, while enabling a wire to be pulled therethrough. The connector comprises a hollow, circumferentially-enclosed, one-piece electrical conduit connector body. Electrical conduit connector body includes a connector end having a first annular portion. First annular portion has a first inner diameter and a first centerline. Electrical conduit connector body also includes a receiving end comprising a second annular portion having a second inner diameter smaller than the first inner diameter. Electrical conduit connector body also includes a second centerline that is perpendicular to, and intersecting the first centerline. Juxtapositioned between is an oblique frustroconical hollow section with a third centerline intersecting, and forming an angle of 45 degrees to the first centerline. The frustroconical hollow section tapers in two opposite directions and in two perpendicular planes.

15 Claims, 5 Drawing Sheets

(56) References Cited

U.S. PATENT DOCUMENTS

| | | | |
|---|---|---|---|
| 2008/0092975 A1* | 4/2008 | Grimes | F16L 43/001 |
| | | | 138/177 |
| 2008/0106095 A1* | 5/2008 | Harris | F16L 21/08 |
| | | | 285/179 |
| 2014/0360776 A1 | 12/2014 | Khodape et al. | |

* cited by examiner

FIG. 2A

Section A-A

CONNECTOR FOR ELECTRICAL CONDUIT AND METHOD OF USE

CROSS-REFERENCE TO RELATED APPLICATIONS

None.

FEDERALLY SPONSORED RESEARCH OR DEVELOPMENT

None.

TECHNICAL FIELD

The present invention relates to connectors for securing electrical conduit to housings, such as junction boxes, fixtures, and the like.

BACKGROUND

Electrical conduit is frequently used in residential and commercial wiring in order to satisfy building codes. Flexible electrical conduit is often used because of its versatility, but rigid electrical conduit is also used. Wiring typically originates at a central fuse box, junction box, or other electrical housing, and may terminate at, or pass through, a variety of fixtures or other various electrical housings requiring electrical connections. In order to prevent the wire from being pulled free at any of these locations, the electrical conduit may be secured to the junction box and any fixture or other electrical housing along the way.

Conventionally, when it is desired to approach a junction box or other electrical housing along its side, i.e., with the axis of the electrical conduit perpendicular to the axis of a knockout hole in a junction box through which the wiring in the electrical conduit must pass, a right-angle connector, also sometimes called a 90-degree connector or elbow connector, is employed. Right-angle connectors typically include several parts, such as a body, a locking nut, a cap, screws, or other connection means depending on the electrical conduit type (e.g., rigid electrical conduit, flexible electrical conduit, Electrical Metallic Tubing or EMT, liquid-tight electrical conduit) and connector type (e.g., compression fittings, rigid coupling fittings, flexible electrical conduit clamps, set-screw type fittings, threaded fittings, liquid-tight fittings, and the like). A first open portion of the body of the right-angle connector is typically inserted into the knockout hole and secured therein using securing means, such as a locking nut, snap-together fitting, or sealed fitting, for example. The electrical conduit is then laid in or otherwise connected with a second open portion of the body of the right-angle connector (sometimes called the cap) and attached thereto, for instance using screws, a threaded connection, a sealed connection, or other fastening means.

Once the electrician installs the enclosures, routes electrical conduit between each enclosure, and installs connectors, the electrician must then pull all necessary electrical wiring through the electrical conduit, through the connectors, and into the respective fixtures, junction boxes, and other enclosures. Importantly, it can be difficult and often impossible for the electrician to pull or otherwise feed electrical wiring through an enclosed right-angle connector, due to the sharp 90-degree turn, because electrical wire will typically not bend around such a tight turn when fed into one end of the right-angle connector. This is especially true for low-profile right-angle connectors that are sized and shaped to fit into tight spaces, for instance where the electrical conduit approaches a junction box or other electrical housing closely along its side, wherein the connector must, over a short distance, turn the electrical wire sharply through a 90-degree angle into the junction box or other electrical housing.

Accordingly, many complex systems have been devised to facilitate the pulling or feeding of electrical wire through a right-angle connector, often involving some kind of moveable cover that allows the electrician to access the interior of the right-angle connector, so that the electrician can manually bend and feed the electrical wire around the 90-degree turn. Examples of such systems are shown in, for instance, U.S. Pat. No. 1,887,192 A to Betts, Jr., issued Nov. 8, 1932 and entitled Electrical conduit Box ("Betts, Jr."); U.S. Pat. No. 1,888,546 A to Anderson, issued Nov. 22, 1932 and entitled Box Connection or Elbow ("Anderson"); U.S. Pat. No. 2,967,722 A to Lifka, issued Jan. 10, 1961 and entitled Angular Connector Fittings for Flexible Electrical conduit ("Lifka"); U.S. Pat. No. 5,872,335 A to Mullen, Jr., issued Feb. 16, 1999 and entitled 90 Degree Sealing Nut ("Mullen, Jr."); US 2002/0125033 A1 to Blake, published Sep. 12, 2002 and entitled Connector for Flexible Electrical conduit ("Blake"); and US 2014/0360776 A1 to Khodape, et al., published Dec. 11, 2014 and entitled Electrical conduit Connectors and Methods for Making and Using the Same ("Khodape, et al."), all of which are hereby incorporated herein by reference in their entireties as if fully set forth herein.

The above types of multi-piece right-angle connectors are to varying degrees complex, expensive to manufacture, difficult to use, prone to manufacturing defects, misuse by electricians, breakage, and leakage. Moreover, in tight installation spaces, for instance where the electrical conduit must approach a junction box or other electrical housing closely along its side, the electrician might not be able to properly access the removable covers and manually manipulate the electrical wires around the 90-degree turn (or if possible, doing so may be very difficult and time consuming).

Accordingly, a long-felt need remains for an improved right-angle connector for electrical conduit.

SUMMARY

Provided in various example embodiments is a novel connector for electrical conduit and method of use that elegantly overcome the problems of the prior art and provide other advantages as will be apparent to persons of skill in the art. The connector may be designed to make a 90-degree conduit turn behind drywall or in other tight spaces where space for, and/or access to, the connector is limited. The connector may be designed to save time and space, while facilitating pulling wire there through. For example, provided in various embodiments is a hollow, circumferentially-enclosed, one-piece electrical conduit connector body, comprising: a connecting end comprising a first annular portion having a first inner diameter and a first centerline; a receiving end comprising a second annular portion having a second inner diameter smaller than the first inner diameter and a second centerline perpendicular to and intersecting the first centerline; an oblique frustroconical hollow section connecting the connecting end with the receiving end and having an interior surface defining a third centerline; the oblique frustroconical hollow section tapering in a first direction, from a first larger interior width to a first smaller interior width as it extends from the receiving end to the connecting end, in a first cross-sectional plane that encompasses the first and second centerlines and bisects the body; and the oblique frustroconical hollow section tapering in a second direction opposite the first direction, from a second larger interior width to a second smaller interior width as it extends from the connecting end to the receiving end, in a second cross-sectional plane that encompasses the third centerline and is perpendicular with the first cross-sectional plane.

In various example embodiments the hollow, circumferentially-enclosed, one-piece electrical conduit connector body may further comprise the second inner diameter is at least 10%, 20%, or 30% smaller than the first inner diameter, depending on the embodiment. In various example embodiments the hollow, circumferentially-enclosed, one-piece electrical conduit connector body may further comprise the third centerline intersecting the first centerline at an angle of at least 45, 50, or 55 degrees, depending on the embodiment. In various example embodiments the hollow, circumferentially-enclosed, one-piece electrical conduit connector body may further comprise the connecting end is sized and shaped to extend into a hole in an electrical housing and to be removably fastened with the electrical housing, such that the oblique frustroconical hollow section is configured to extend proximate to the electrical housing when the connecting end is removably fastened with the electrical housing. In various example embodiments the hollow, circumferentially-enclosed, one-piece electrical conduit connector body may further comprise the receiving end is sized and shaped to be attached with electrical conduit. In various example embodiments the hollow, circumferentially-enclosed, one-piece electrical conduit connector body may further comprise the receiving end is positioned relative to the connecting end such that the receiving end is configured to be positioned a distance away from the electrical housing when the connecting end is removably fastened with the electrical housing, wherein that distance is less than the second inner diameter, or is less than two-thirds of the second inner diameter, or is less than half of the second inner diameter, depending on the embodiment.

Also provided in various example embodiments is an electrical conduit connector, comprising the hollow, circumferentially-enclosed, one-piece electrical conduit connector body as described herein, and an attachment mechanism attached with the receiving end and configured to attach the body to electrical conduit. In various example embodiments the attachment mechanism may further comprise a hollow receptacle portion configured to receive therein and mate with the electrical conduit. In various example embodiments the attachment mechanism may further comprise a threaded section configured to attach the body to threaded electrical conduit. In various example embodiments the attachment mechanism may further comprise a clamp configured to attach the body to flexible electrical conduit. In various example embodiments the attachment mechanism may further comprise a resilient elastomeric seal configured to attach the body to sealable electrical conduit. In various example embodiments the attachment mechanism may further comprise a compression fitting configured to attach the body to the electrical conduit by radial compression.

Also provided in various example embodiments is an electrical conduit connector, comprising the hollow, circumferentially-enclosed, one-piece electrical conduit connector body as described herein, wherein the connecting end comprises a threaded portion, or a snap-fastening mechanism, sized and shaped to removably fasten with another fastener, such as a nut, or with the electrical housing, to removably fasten the electrical conduit connector with the electrical housing, which may comprise a central fuse box, junction box, fixture, or other structure housing electrical wiring connections.

Further provided in various example embodiments is a method of installing and using an electrical conduit connector as described herein, comprising the following steps, in any suitable order: providing an electrical conduit connector as provided in any of the example embodiments, connecting the connecting end of the electrical conduit connector to an electrical housing, connecting electrical conduit to the receiving end of the electrical conduit connector, and pulling electrical wire between the electrical conduit and the electrical housing through the hollow, circumferentially-enclosed, one-piece electrical conduit connector body.

The foregoing summary is illustrative only and is not meant to be exhaustive or limiting. Other aspects, objects, and advantages of various example embodiments will be apparent to those of skill in the art upon reviewing the accompanying drawings, disclosure, and appended claims.

BRIEF DESCRIPTION OF THE DRAWINGS

Reference will be made to the following figures. These figures are not necessarily to scale and are not meant to limit the invention to the embodiments shown in the figures, but rather are provided to illustrate possible conceptual aspects according to various non-limiting example embodiments.

DETAILED DESCRIPTION OF EXAMPLE EMBODIMENTS

Reference will now be made in detail to some specific example embodiments, including any best mode contemplated by the inventor. Examples of these specific embodiments are illustrated in the accompanying drawings. While the invention is described in conjunction with these specific embodiments, it will be understood that it is not intended to limit the invention to the described or illustrated embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments may be implemented without some or all of these features or specific details. In other instances, components and procedures well known to persons of skill in the art have not been described in detail in order not to obscure inventive aspects.

Various techniques and mechanisms will sometimes be described in singular form for clarity. However, it should be noted that some embodiments may include multiple iterations of a technique or multiple components, mechanisms, and the like, unless noted otherwise. Similarly, various steps of the methods shown and described herein are not necessarily performed in the order indicated, or performed at all in certain embodiments. Accordingly, some implementations of the methods discussed herein may include more or fewer steps than those shown or described.

Further, the example techniques and mechanisms described herein will sometimes describe a connection, relationship or communication between two or more items or entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection unless otherwise noted.

Referring now in detail to the drawings, FIG. 1A through FIG. 3, wherein like elements are indicated by like numerals, there is shown an novel connector 200 for electrical conduit 300 and method of use that elegantly overcome the problems of the prior art and provide other advantages as will be apparent to persons of skill in the art. Provided in various example embodiments is a hollow, circumferentially-enclosed, one-piece electrical conduit connector body 100. Circumferentially-enclosed means that unlike the incorporated prior art references devised to facilitate the pulling or feeding of electrical wire through a right-angle connector, the present body 100 need not include a moveable cover that allows the electrician to access the interior of the right-angle connector, so that the electrician can manually bend and feed the electrical wire around the 90-degree turn. The body 100 may be formed from any suitable material, such as steel, cast aluminum, or polymers having sufficient mechanical properties. The body 100 may be provided in any suitable sizes, such as, for example, trade sizes one-half inch to one inch for rough-in purposes, and one-and-one-quarter inch to three-and-one-half inches for mechanical rooms and industrial applications.

With continuing reference to FIG. 1A through FIG. 3, in various example embodiments the body 100 may comprise a connecting end 202 comprising a first annular portion 204 having a first inner diameter 206 and a first centerline 208, as well as a receiving end 210 comprising a second annular portion 212 having a second inner diameter 214 smaller than the first inner diameter 206 and a second centerline 216 perpendicular to and intersecting the first centerline 208. In various example embodiments the body 100 may further comprise an oblique frustroconical hollow section 218 connecting the connecting end 202 with the receiving end 210 and having an interior surface 220 defining a third centerline 222. As shown in FIG. 2B, the oblique frustroconical hollow section 218 may taper in a first direction 224, from a first larger interior width 226 to a first smaller interior width 228 as it extends from the receiving end 210 to the connecting end, in a first cross-sectional plane 230 that encompasses the first and second centerlines 208, 216 and bisects the body 100. As shown in FIG. 2D, the oblique frustroconical hollow section 218 may simultaneously taper in a second direction 232 opposite the first direction 224, from a second larger interior width 234 to a second smaller interior width 236 as it extends from the connecting end 202 to the receiving end 210, in a second cross-sectional plane 238 that encompasses the third centerline 222 and is perpendicular with the first cross-sectional plane 230. In other words, the oblique frustroconical hollow section 218 may simultaneously taper in two opposite directions 224, 232 in two perpendicular planes 230, 238.

Figures 1A, 1B, 1C, 1D, 1G, 1H:
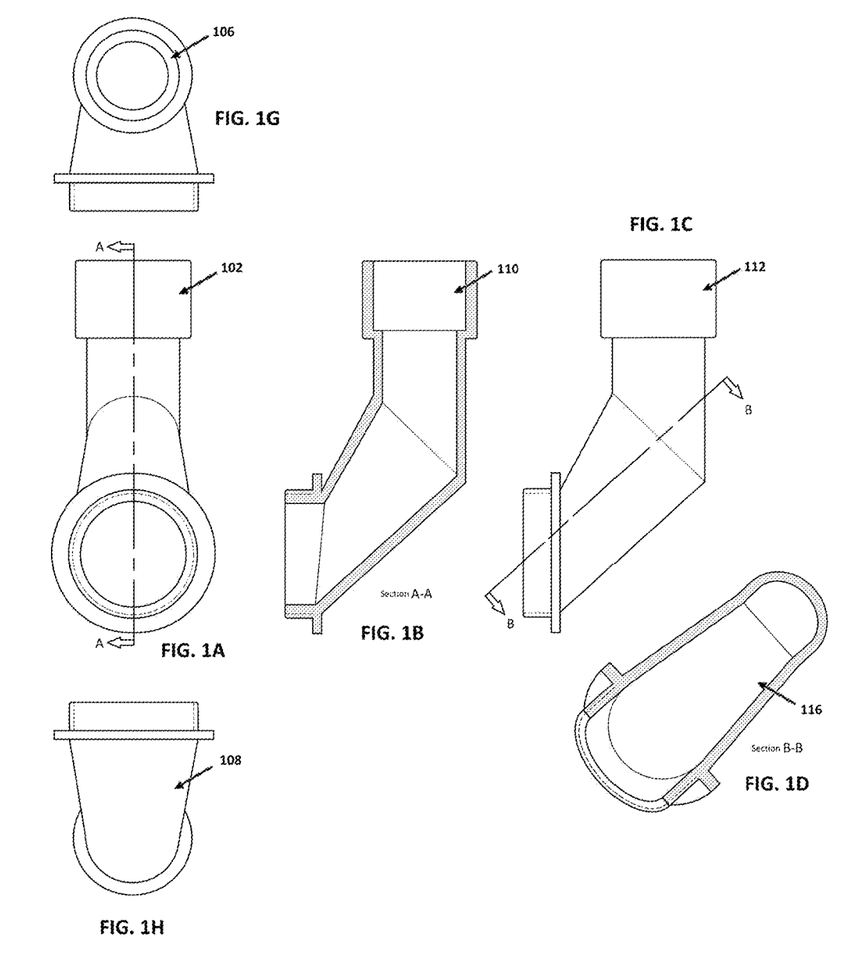
FIGS. 1A and 2A are front elevation views 102 of an example hollow, circumferentially-enclosed, one-piece conduit connector body according to various example embodiments.
FIGS. 1B and 2B are cross-sectional views 110 of the example body of FIGS. 1A and 2A, taken along section line A-A in FIGS. 1A and 2A, according to various example embodiments.
FIGS. 1C and 2C are right side elevation views 112 of the example body of FIGS. 1A and 2A according to various example embodiments.
FIGS. 1D and 2D are cross-sectional views 116 of the example body of FIGS. 1A and 2A, taken along section line B-B in FIGS. 1C and 2C, according to various example embodiments.
FIG. 1G is a top plan view 106 of the example body of FIGS. 1A and 2A according to various example embodiments.
FIG. 1H is a bottom plan view 108 of the example body of FIGS. 1A and 2A according to various example embodiments.
Figure 1E:
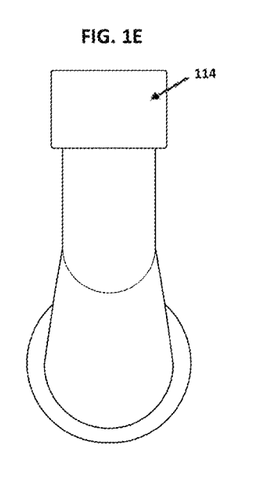
FIG. 1E is a rear elevation view 114 of the example body of FIGS. 1A and 2A according to various example embodiments.
Figure 1F:
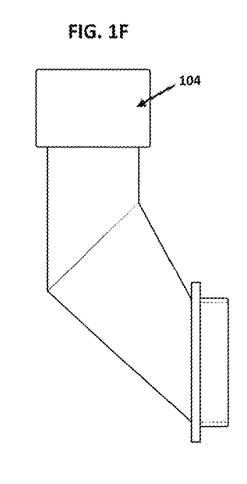
FIG. 1F is a left side elevation view 104 of the example body of FIGS. 1A and 2A according to various example embodiments.
Figure 2A:
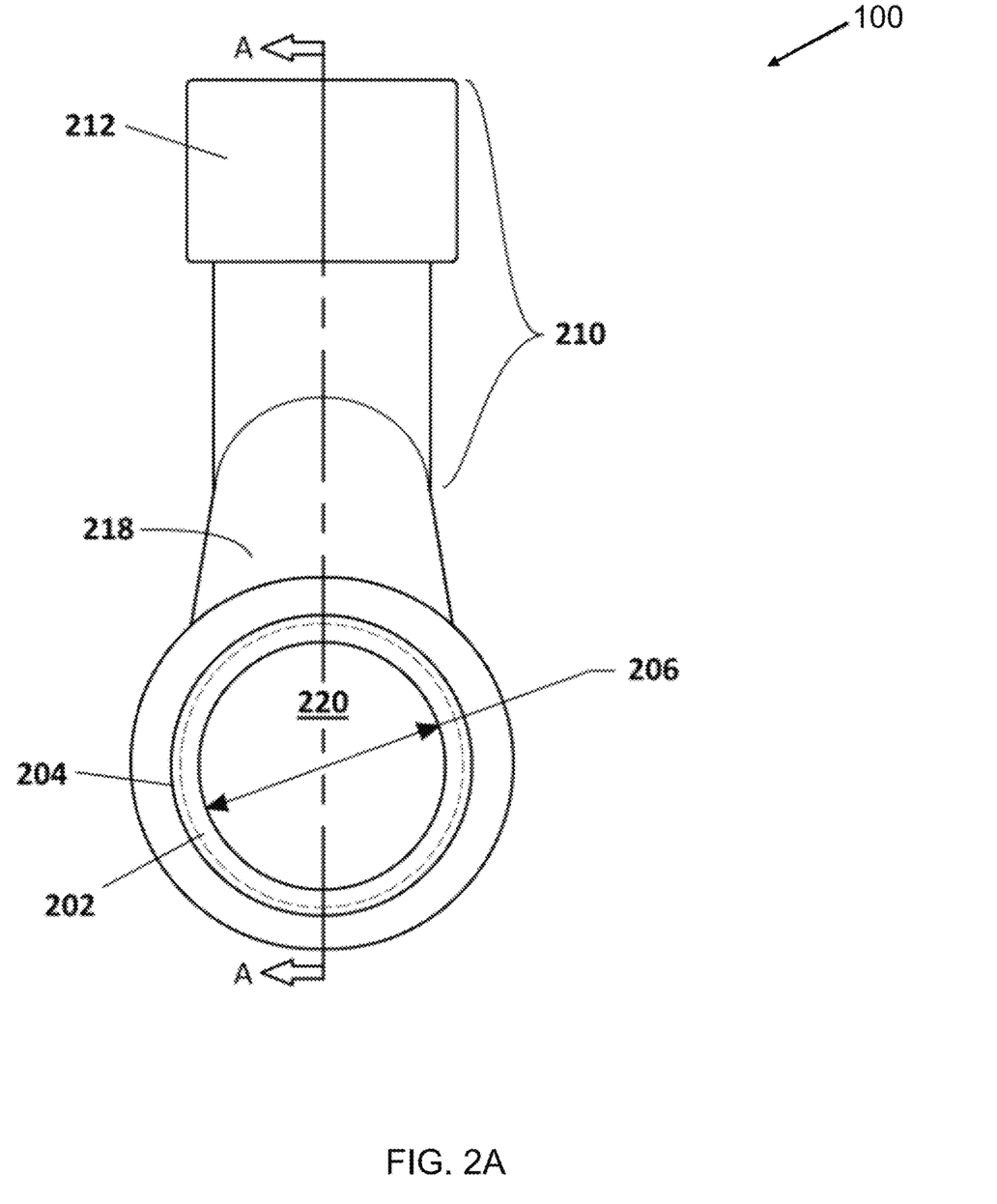
Figure 2B:
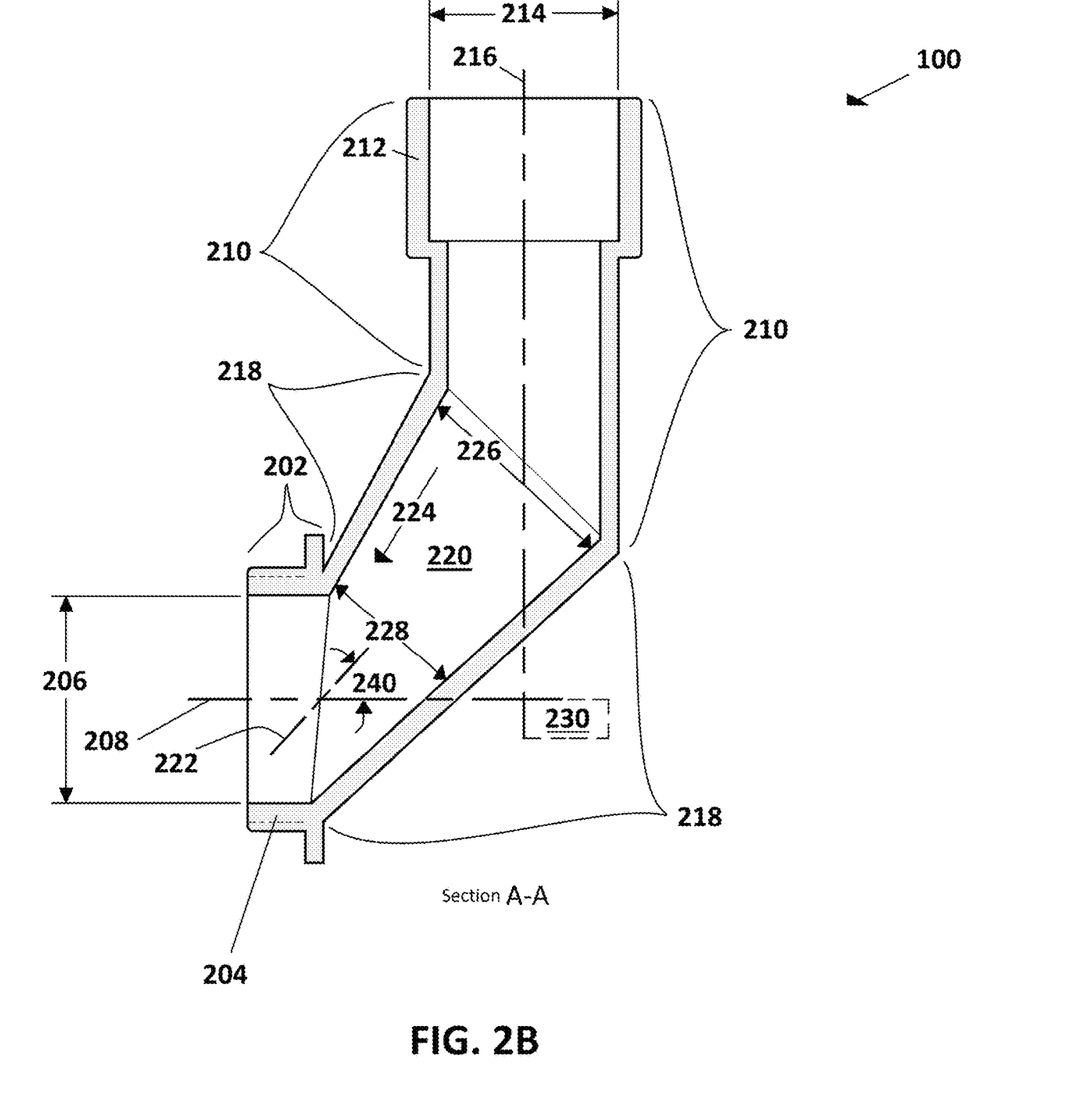
Figures 2C, 2D:
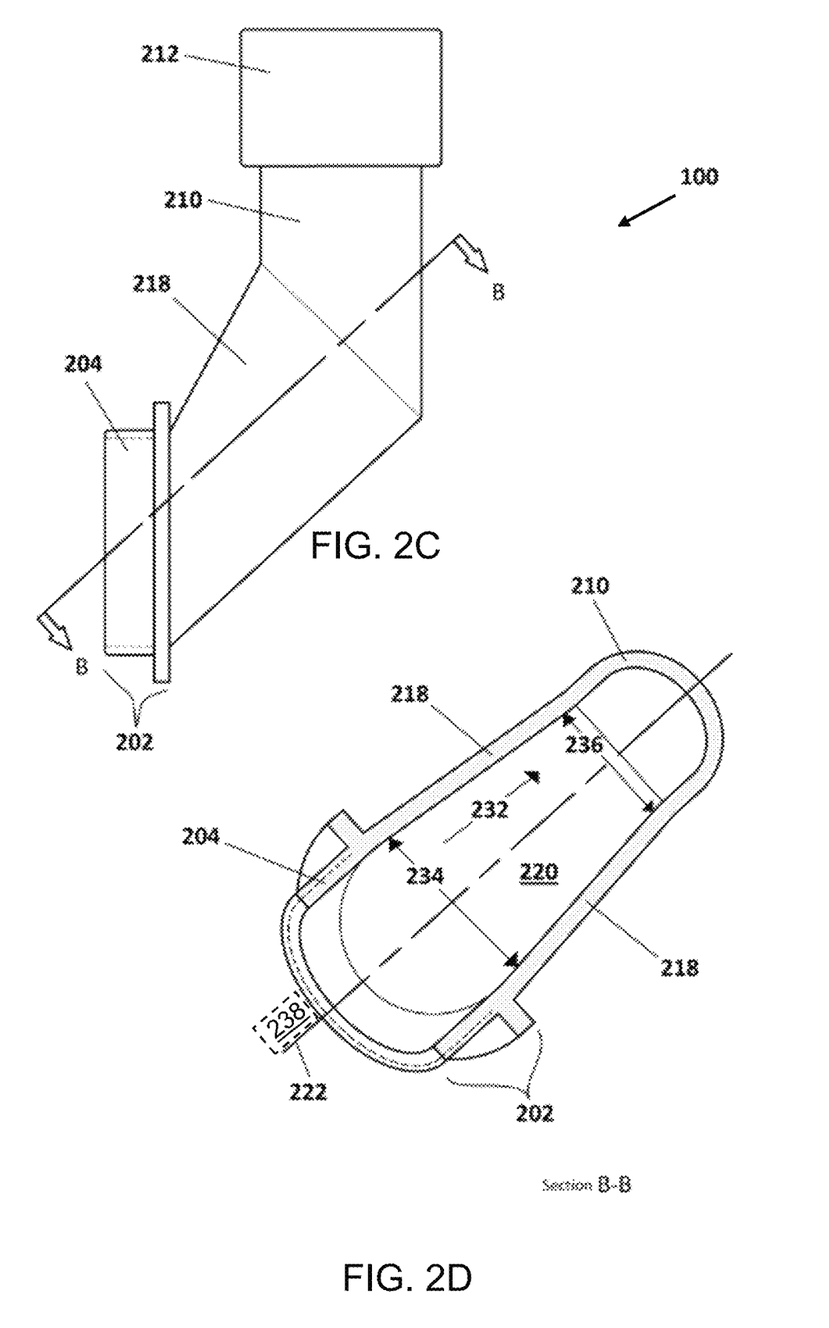

With reference to FIG. 2B, in various example embodiments the hollow, circumferentially-enclosed, one-piece electrical conduit connector body 100 may further comprise the second inner diameter 214 is at least 10%, 20%, or 30% smaller than the first inner diameter 206, depending on the embodiment. In various example embodiments the hollow, circumferentially-enclosed, one-piece electrical conduit connector body 100 may further comprise the third centerline 222 intersecting the first centerline 208 at an angle 240 of at least 45, 50, or 55 degrees, depending on the embodiment.

Figure 3:
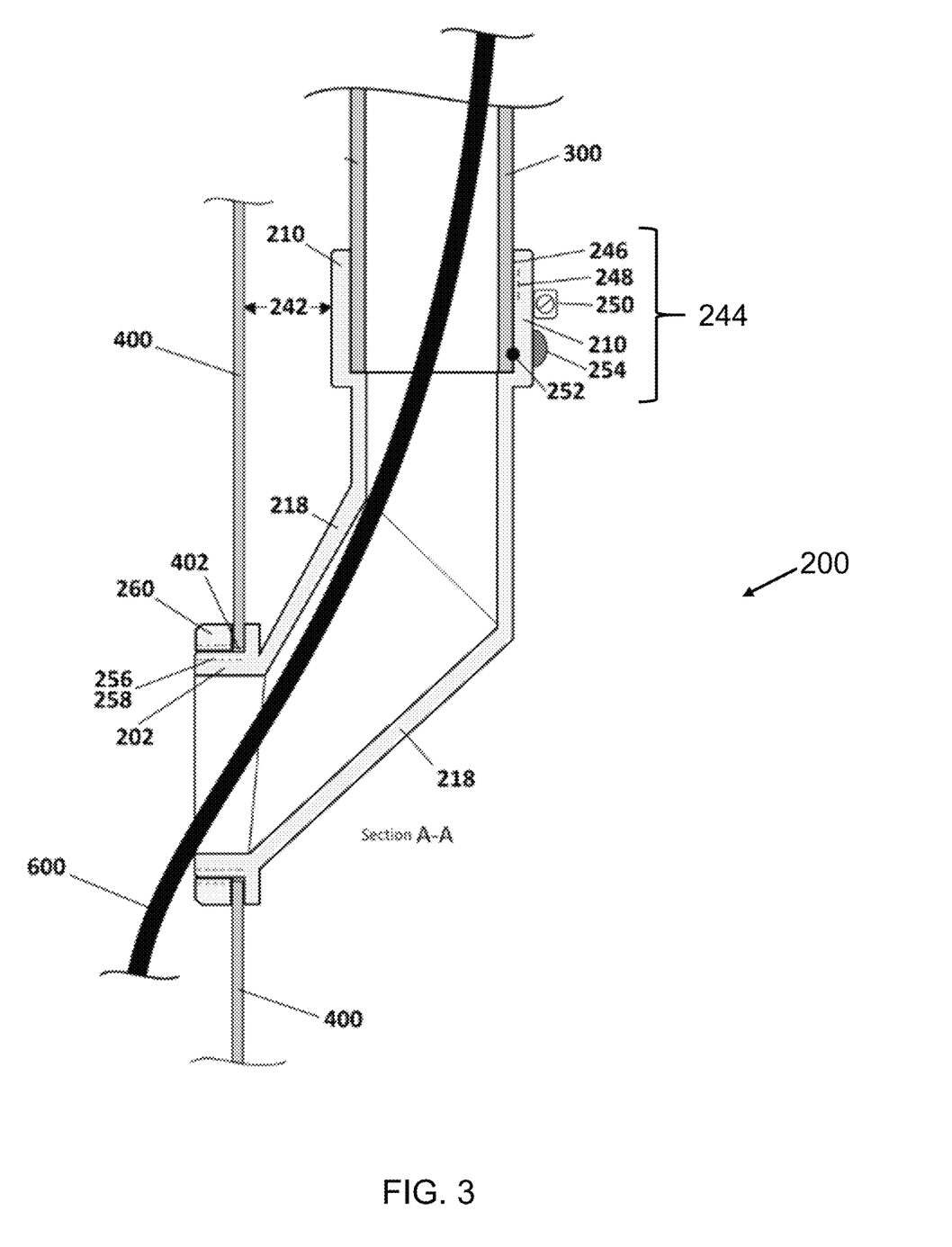
FIG. 3 is a cross-sectional view 110 of the example body of FIGS. 1A and 2A, taken along section line A-A in FIGS. 1A and 2A, combined with other example components to form an example connector, shown in an example installation, according to various example embodiments.

Turning to FIG. 3, in various example embodiments the hollow, circumferentially-enclosed, one-piece electrical conduit connector body 100 may further comprise the connecting end 202 is sized and shaped to extend into a hole 402 (shown as a gap in a side cross-sectional view) in an electrical housing 400 (wall of housing 400 shown in a side cross-sectional view) and to be removably fastened with the electrical housing 400, such that the oblique frustroconical hollow section 218 is configured to extend proximate to the electrical housing 400 when the connecting end 202 is removably fastened with the electrical housing 400. In various example embodiments the hollow, circumferentially-enclosed, one-piece electrical conduit connector body 100 may further comprise the receiving end 210 is sized and shaped to be attached with electrical conduit 300. In various example embodiments the hollow, circumferentially-enclosed, one-piece electrical conduit connector body 100 may further comprise the receiving end 210 is positioned relative to the connecting end 202 such that the receiving end 210 is configured to be positioned a distance 242 away from the electrical housing 400 when the connecting end 202 is removably fastened with the electrical housing 400, wherein that distance 242 is less than the second inner diameter 214 (see FIG. 2B), or is less than two-thirds of the second inner diameter 214, or is less than half of the second inner diameter 214, depending on the embodiment.

Also provided in various example embodiments, such as the example shown in cross-section in FIG. 3, is an electrical conduit connector 200, comprising the hollow, circumferentially-enclosed, one-piece electrical conduit connector body 100 as described herein, and an attachment mechanism 244 attached with the receiving end 210 and configured to attach the body 100 to electrical conduit 300. It is understood that for the sake of simplicity FIG. 3 depicts only portions of various example attachment mechanisms 244. For example, the attachment mechanism 244 may comprise a hollow receptacle portion 246 configured to receive therein and mate with the electrical conduit 300. Additionally or alternatively, the attachment mechanism 244 may comprise a threaded section 248 configured to attach the body 100 to threaded electrical conduit 300. In various example embodiments the attachment mechanism 244 may comprise a clamp 250 (and/or, a set screw) configured to attach the body 100 to flexible electrical conduit 300. In various example embodiments the attachment mechanism 244 may further comprise a resilient elastomeric seal 252 configured to attach the body 100 to sealable electrical conduit 300. In various example embodiments the attachment mechanism 244 may comprise a compression fitting 254 configured to attach the body 100 to the electrical conduit 300 by radial compression. Any other suitable mechanism for connecting the body 100 to conduit 300 may be used and may comprise a portion of electrical conduit connector 200.

Also provided in various example embodiments is an electrical conduit connector 200, comprising the hollow, circumferentially-enclosed, one-piece electrical conduit connector body 100 as described herein, wherein the connecting end 202 comprises a threaded portion 256, or a snap-fastening mechanism 258, sized and shaped to removably fasten with another fastener 260, such as a nut, or with the electrical housing 400 (for instance if the hole 402 were threaded), to removably fasten the electrical conduit connector 200 with the electrical housing 400. In various example embodiments the electrical housing 400 may comprise a central fuse box, junction box, fixture, or other structure housing electrical wiring connections.

Further provided in various example embodiments is a method of installing and using an electrical conduit connector 200 as described herein, comprising the following steps, in any suitable order: providing an electrical conduit connector 200 as provided in any of the example embodiments, connecting the connecting end 202 of the electrical conduit connector 200 to an electrical housing 400, connecting electrical conduit 300 to the receiving end 210 of the electrical conduit connector 200, and pulling electrical wire 600 between the electrical conduit 300 and the electrical housing 400 through the hollow, circumferentially-enclosed, one-piece electrical conduit connector body 100. It is understood that electrical wire 600 may comprise any type of wire, cable, or the like, which is pulled through conduit 300.

As used herein, the terms "90 degrees", "right angle", and "perpendicular" are not to be limited to precisely 90.0000 degrees, but are terms of art understood to mean and include any angle that would be considered roughly 90 degrees, as that term is used and understood for construction purposes, for instance by electricians in the field.

It is understood that the above-described embodiment is merely illustrative of the application. Other embodiments may be readily devised by those skilled in the art, which will embody the principles of the invention and fall within the spirit and scope thereof.

What is claimed is:

1. A hollow, circumferentially-enclosed, one-piece electrical conduit connector body, comprising:
a connecting end comprising a first annular portion having a first inner diameter and a first centerline,
the connecting end further comprising a threaded portion, or a snap-fastening mechanism;
a receiving end comprising a second annular portion having a second inner diameter smaller than the first inner diameter and a second centerline perpendicular to, and intersecting the first centerline; and
an oblique frustroconical hollow section connecting the connecting end with the receiving end and having an interior surface defining a third centerline;
the oblique frustroconical hollow section tapering in a first direction, from a first larger interior width to a first smaller interior width while the oblique frustroconical hollow section extends from the receiving end to the connecting end,
the oblique frustroconical hollow section further being disposed in a first cross-sectional plane that encompasses the first and second centerlines and bisects the electrical conduit connector body,
the oblique frustroconical hollow section tapering in a second direction opposite the first direction, from a second larger interior width to a second smaller interior width while the oblique frustroconical hollow section extends from the connecting end to the receiving end,
the oblique frustroconical hollow section further being disposed in a second cross-sectional plane that encompasses the third centerline and is perpendicular with the first cross-sectional plane.

2. The hollow, circumferentially-enclosed, one-piece electrical conduit connector body of claim 1, further comprising:
the second inner diameter is at least 10% smaller than the first inner diameter.

3. The hollow, circumferentially-enclosed, one-piece electrical conduit connector body of claim 1, further comprising:
the second inner diameter is at least 20% smaller than the first inner diameter.

4. The hollow, circumferentially-enclosed, one-piece electrical conduit connector body of claim 1, further comprising:
the second inner diameter is at least 30% smaller than the first inner diameter.

5. The hollow, circumferentially-enclosed, one-piece electrical conduit connector body of claim 1, further comprising:
the third centerline intersects that first centerline at an angle of at least 45 degrees.

6. The hollow, circumferentially-enclosed, one-piece electrical conduit connector body of claim 1, further comprising:
the third centerline intersects that first centerline at an angle of at least 50 degrees.

7. The hollow, circumferentially-enclosed, one-piece electrical conduit connector body of claim 1, further comprising:
the third centerline intersects that first centerline at an angle of at least 55 degrees.

8. The hollow, circumferentially-enclosed, one-piece electrical conduit connector body of claim 1, further comprising:
the connecting end is sized and shaped to extend into a hole in an electrical enclosure and to be removably fastened with the electrical enclosure, such that the oblique frustroconical hollow section is configured to extend proximate to the electrical enclosure when the connecting end is removably fastened with the electrical enclosure.

9. The hollow, circumferentially-enclosed, one-piece electrical conduit connector body of claim 1, further comprising:
the receiving end is sized and shaped to be attached with an electrical conduit.

10. The hollow, circumferentially-enclosed, one-piece electrical conduit connector body of claim 9, further comprising:

an attachment mechanism attached with the receiving end, the attachment mechanism configured to attach the electrical conduit connector body to the electrical conduit.

11. The hollow, circumferentially-enclosed, one-piece electrical conduit connector body of claim 10, further comprising:

the attachment mechanism comprising a hollow receptacle portion configured to receive and mate with the electrical conduit.

12. The hollow, circumferentially-enclosed, one-piece electrical conduit connector body of claim 10, further comprising:

the attachment mechanism comprising a threaded section configured to attach the electrical conduit connector body to the electrical conduit, whereby the electrical conduit is threaded.

13. The hollow, circumferentially-enclosed, one-piece electrical conduit connector body of claim 10, further comprising:

the attachment mechanism comprising a clamp configured to attach the electrical conduit connector body to the electrical conduit, whereby the electrical conduit is flexible.

14. The hollow, circumferentially-enclosed, one-piece electrical conduit connector body of claim 10, further comprising:

the attachment mechanism comprising a resilient elastomeric seal configured to attach the electrical conduit connector body to the electrical conduit, whereby the electrical conduit is sealable.

15. The hollow, circumferentially-enclosed, one-piece electrical conduit connector body of claim 10, further comprising:

the attachment mechanism comprising a compression fitting configured to attach the electrical conduit connector body to the electrical conduit by radial compression.

\* \* \* \* \*